United States Patent [19]

Cohen et al.

[11] 3,736,571

[45] May 29, 1973

[54] METHOD AND SYSTEM FOR IMPROVED OPERATION OF CONDUCTOR-INSULATOR-SEMICONDUCTOR CAPACITOR MEMORY HAVING INCREASED STORAGE CAPABILITY

[75] Inventors: Mitchell S. Cohen, Lexington; John S. Moore, Belmont, both of Mass.

[73] Assignee: Micro-Bit Corporation, Lexington, Mass.

[22] Filed: Feb. 10, 1971

[21] Appl. No.: 114,113

[52] U.S. Cl..........340/173 CR, 307/238, 340/173 LS

[51] Int. Cl..............................................G11c 11/42

[58] Field of Search................307/238; 340/173 CR, 340/173 PP, 173 LS

[56] References Cited

UNITED STATES PATENTS 3,623,026 11/1971 Engeler.........................340/173 CR

*Primary Examiner*—Terrell W. Fears
*Attorney*—Charles W. Helzer

[57] ABSTRACT

A computer memory system employing a planar metal-insulator semiconductor-metal memory capacitor sandwich for selectively storing an array of electric charges in the insulator near the insulator-semiconductor interface in patterns which are representative of binary encoded data. The method and system for initially uniformly charging the planar surface of the insulator of a memory capacitor employing p-type semiconductors with positive polarity electric charges, maintaining the positive electric charges at those data bit sites representative of binary "I's" and removing positive charges at the binary "O" data sites to form non-charged areas of diameter D surrounding the binary O data bit sites where D is the equivalent or greater than several electron path diffusion lengths in the semiconductor. The positive charges are formed in the insulator layers by bombarding the insulator with an electron beam while maintaining a positive polarity electric field across the memory capacitor. At the data bit sites where binary "O's" are to be written, a negative polarity field gradient is established across the capacitor while irradiating the selected bit site with the electron beam. At each bit site the electron beam is appropriately manipulated by causing it to trace out a circular path of diameter $D>d$ where d is the diameter of the electron beam. By spacing the data bit sites apart a distance $L>D$ where the center-to-center spacing distance L is on the order of 20 microns or less, a grid-like lattice of positive electric charges is formed at the insulator-semiconductor interface which surrounds all of the data bit sites. This in turn induces a corresponding interconnected grid-like lattice layer of strongly inverted and highly conducting semiconductor adjacent to the insulator-semiconductor interface. This highly conductive inverted semiconductor lattice layer surrounds and interconnects substantially all of the positively charged data bit sites but is separated from the non-charged, binary O bit sites by the distance D/2 which is the equivalent of or > several electron path diffusion lengths in the semiconductor. In memory capacitors using n-type semiconductors, the inverse of the charge states in p-type semiconductors is employed. During reading, a readout electron beam selectively probes the data bit sites while a substantially zero voltage or slightly negative bias potential is maintained across the memory capacitor. Upon probing a charged binary 1 bit site, electron-hole pair carriers are formed and are separated by the electric field of a depletion region induced in semiconductor layer as a consequence of the positive charges. The electron current is conductively connected to the highly conducting grid-like inverted lattice layer in the semiconductor and results in a relatively large capacitor charging current to the memory capacitor and a corresponding large output signal. Upon impinging into a non-charged binary O data bit site, electron-hole pair carriers produced in the semiconductor by the electron beam recombine within the non-charged region of diameter D prior to reaching the strongly conducting, inverted, grid-like layer. Hence, at most only a minimal charging current to the memory capacitor is produced that is readily distinguished from the output current produced at the charged binary 1 data bit sites. Enhanced operation is obtained by pretreatment of the semiconductor through gold doping or annealing in oxygen at the high temperatures in order to enhance recombination rates in the non-charged areas of diameter D. Treatment of the metalized face of the insulator that is subjected to the write-read electron beam to produce a metal thickness on the order of 2,000 A units plus or minus 500 A units results in overcoming undesired disturb effects produced by scattering electrons. By appropriate read-rewrite techniques interaction on adjacent bit sites by scattering electrons can be minimized and long term degradation of the memory over a number of operating cycles prevented.

40 Claims, 6 Drawing Figures

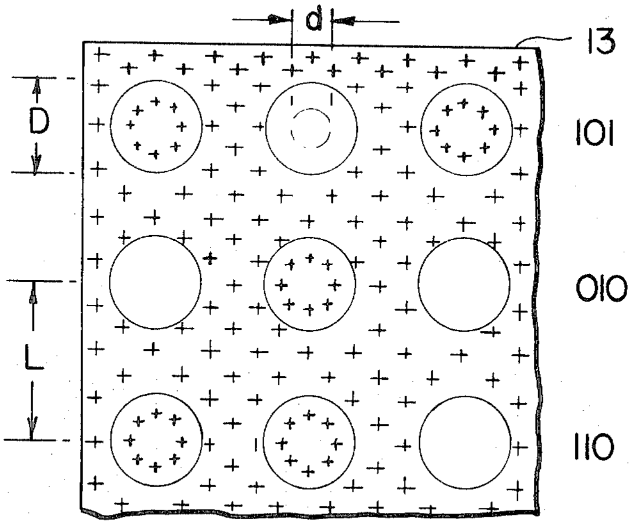
d
13
D
101
010
L
110

INVENTORS
MITCHELL S. COHEN
JOHN S. MOORE

BY Charles W. Helzer
ATTORNEY

INVENTORS
MITCHELL S. COHEN
JOHN S. MOORE

BY *Charles W. Helzer*

ATTORNEY

INVENTORS
MITCHELL S. COHEN
JOHN S. MOORE

BY Charles W. Helzer
ATTORNEY

METHOD AND SYSTEM FOR IMPROVED OPERATION OF CONDUCTOR-INSULATOR-SEMICONDUCTOR CAPACITOR MEMORY HAVING INCREASED STORAGE CAPABILITY

BACKGROUND OF INVENTION

1. Field of Invention

This invention relates to high density-quick access memory systems for computers and their method of operation.

More specifically, the invention relates to a new and improved method of operation and computer memory system employing planar metal-insulator-semiconductor-metal memory capacitors enclosed in an electron beam apparatus for writing and reading-out charge states at extremely small data bit sites on the surface of the memory capacitors to thereby record and subsequently read-out data stored in the memory.

2. Prior Art Problem

In a paper entitled "Electron Beam Detection Of Charge Storage In MOS Capacitors" by M.S. Cohen, D.O. Smith and E.E. Huber, Jr. — published in the Applied Physics Letters of the American Institute of Physics—volume16, Number 4 - Feb. 15, 1970 - Pages 147–149, the essential features of a high density-electron beam accessed MOS memory of the above-mentioned type has been described. In attempting to build and operate a memory in the manner taught by the Applied Physics Letters article, it was determined that in order to operate reliably and provide an unambiguous read-out of binary data stored in the memory, the center to center spacing between the data bits had to be large on the order of 200 microns (200 micrometers) or greater. With a center to center spacing between the data bits of this magnitude, MOS capacitor memories become economically unattractive due to their greatly increased size and complexity. In order to overcome this difficulty and provide a means for reducing the data bit spacing to a value on the order of 20 microns or less, the present invention was devised.

SUMMARY OF INVENTION

It is therefor a primary object of the invention to provide a new and improved computer memory method of operation and system employing planar metal-insulator-semiconductor-metal memory capacitors disposed in an electron beam apparatus for writing and reading-out data bit charge states at data bit sites on the surface of the memory capacitor to thereby record and subsequently read-out data stored in the memory capacitor in binary encoded form in a reliable manner.

Another object of the invention is to provide such a system which is capable of storing data bits in the memory capacitor with only 20 microns or less center to center spacing between the data bits sites whereby a large capacity, quick access memory operated in this manner becomes economically feasible.

In practicing the invention a memory system and method of operation is described employing a planar metal-insulator-semiconductor-metal memory capacitor sandwich for selectively storing an array of electric charges in the insulator near the insulator-semiconductor interface in patterns which are representative of binary encoded data. Where the memory capacitor is fabricated from p-type semiconductors, the method and system employs means for initially uniformly charging the planar surface of the insulator with positive polarity electric charges by irradiating the insulator with an electron beam while maintaining a positive polarity electric field gradiant across the memory capacitor. At those data bit sites where it is desired to record binary data bits of one form (such as binary ones) the positive electric charges are retained. At those data bits sites representative of the remaining form of binary bit (such as binary 0) the charges are removed within an area of diameter D surrounding the binary 0 data bit sites where D is the equivalent to or > several electron path diffusion lengths in the semiconductor. To form the non-charged or binary 0 data sites, the sites are irradiated with the electron beam of diameter $d$ in the presence of a negative polarity electric field gradiant across the memory capacitor and the electron beam is manipulated by defocusing or causing it to trace out a circular path of diameter $D > d$. By spacing the data bit sites a distance $L>D$ on the order of 20 microns, where D is on the order of 10 microns and the diameter of the electron beam $d$ is on the order of 5 microns, a grid-like lattice of positive electric charges will be retained in the insulator which surrounds all of the bit sites at the insulator-semiconductor interface. This grid-like lattice of positive electric charges results in forming a corresponding interconnected grid-like lattice layer of strongly inverted, highly conductive semiconductor adjacent the insulator-semiconductor interface. This highly conducting, inverted grid-like semiconductor lattice layer surrounds and interconnects all of the positively charged (binary 1) bit sites but is separated from the non-charged (binary 0) bit sites by the distance D equivalent to or greater than several electron diffusion path lengths in the semiconductor.

During read-out, a reading electron beam of sufficient energy to penetrate into the region of the semiconductor layer and of diameter $d<D<L$ selectively probes the data bit sites while maintaining substantially zero or slightly negative bias potential across the memory capacitor sandwich. Upon probing a charged (binary 1) data bit site, electron-hole pair carriers are formed and are separated by the electric field of a space charge region induced in the semiconductor layer as a consequence of the positive charges. The electrons of this electron-hole current are conducted throughout the highly conducting grid-like inverted lattice layer in the semiconductor surrounding all of the bit sites and results in inducing a relatively large charging current to the memory capacitor to thereby produce a large output signal indicative of the charged condition (binary 1) of the bit site. Upon impinging into a non-charged bit site (binary 0), electron-hole pair carriers produced in the semiconductor by the electron beam recombine within the non-charged region of diameter D prior to reaching the strongly inverted, highly conducting grid-like semiconductor lattice layer, and hence results in at most a minimal charging current to the memory capacitor that is readily distinguished from the output current produced by the charged (binary 1) bit sites. By the use of appropriate read-rewrite and other techniques, degradation of the memory over a number of cycles of operation is avoided as well as interaction of scattering electrons on adjacent bit sites. By appropriate treatment of the semiconductor through gold doping techniques or annealing in oxygen at high temperature, recombination of the electron carriers induced in the non-charged bit sites by the reading electron beam can be greatly enhanced thereby resulting in further improvement in operation.

BRIEF DESCRIPTION OF DRAWINGS

Other objects, features and many of the attendant advantages of this invention will become better understood after reading the following detailed description when considered in connection with the accompanying drawings wherein; like parts in each of the several figures are identified by the same reference character; and wherein.

DETAILED DESCRIPTION OF PREFERRED EMBODIMENT

Figure 1:
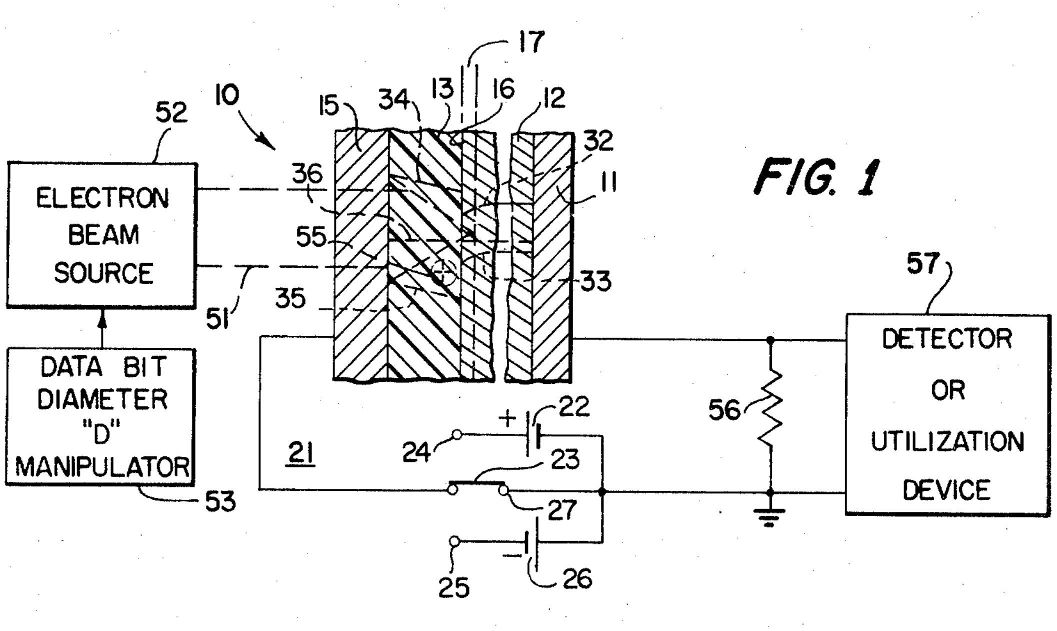
FIG. 1 is a schematic, functional diagram and cross sectional view of a metal-insulator-semiconductor-metal memory sandwich, and illustrates the basic features of construction and operation of an electron beam write-read memory system similar to that described in the above-referenced Applied Physics Letters article.

The above-referenced Applied Physics Letters article describes the fundamental charge storage and read-out mechanisms employed in a metal-insulator-semiconductor-metal capacitor memory system which comprises the subject of the present disclosure. In such a memory system a penetrating electron beam is directed normal to the surface of the metal-insulator-semiconductor-metal memory capacitor and a polarizing potential (bias) is applied across the capacitor that maintains the insulator either positive or negative with respect to the semiconductor depending upon whether information is being written into the memory capacitor and the nature of the information or whether the information is being read-out.

In the writing operation, the electron beam penetrates through the metal film into the insulator, elevating to the conduction band electrons from the valance band and/or from traps in the band gap of the insulator. If the polarizing potential is positive, these electrons are swept from the insulator by the applied polarizing electric field leaving positive charge centers in the insulator adjacent to the interface between the insulator and semiconductor. The position of the stored charge and its magnitude is determined by the magnitude and polarity of the polarizing voltage applied during the electron bombardment and the point of impingement of the electron beam. With a negative polarizing voltage applied across the memory capacitor having a polarity such that the insulator is maintained negative relative to the semiconductor, positive charge will be removed (erased) from the insulator near the insulator-semiconductor interface. By proper selection of the insulator layer and semiconductor layer, either a charged condition or a non-charged condition can be maintained practically indefinitely providing that the ambient temperature remains near 300° K. and provided further that the structure is not subjected to destructive penetrating ionizing radiations such as gamma rays, X-rays, electrons, protons, etc which would tend to alter the charge states in the insulator. Thus, by selective placement of the charge locations and non-charged areas in the insulator layer, data can be recorded in the capacitor memory in binary encoded form. Because the area of the electric charge or non-charge storage can be made to be roughly proportional to the cross sectional area of the scanning electron beam employed to selectively place the charged or non-charged bit sites in the insulator layers, such a memory potentially has a large data storage capacity within an extremely small space.

During read-out of the memory capacitor, a deflectable electron beam can be used to interrogate the different bit sites to detect whether a charge or no charge is present at the different, discrete bit sites on the surface of the capacitor. The electron beam is directed to the same point at which charges previously have been stored or erased in the insulator layer concurrently with the application of a read-out zero or negative polarity biasing potential. If a bit site is charged, the electron beam penetrates into a space charge region induced in the semiconductor by the charged bit site where it creates electron-hole pair carriers that are swept out by the electric field. Thus, if the semiconductor layer is p-type, the presence of a stored electric charge in the insulator layer at the bit site creates a significant depletion region in the semiconductor layer at the insulator-semiconductor interface. Electron-hole carriers are created by the probing electron beam within this region and are swept in opposite directions from the depletion region by the built-in electric field associated with the depletion region, and additionally by the applied reading bias potential where such is used, thereby giving rise to an externally measurable current pulse. At those bit sites where no charge has been stored in the insulator layer, a negligible electron beam induced current is produced which, while perhaps measurable, is significantly lower than that produced at a charged bit site.

FIG. 1 of the drawing is a partial fragmentary, cross-sectional view of a memory capacitor sandwich 10 used in practicing the invention. It is to be understood that the fragmentary section shown in FIG. 1 comprises only a part of a complete memory capacitor. Such a complete memory capacitor normally would comprise a planar, wafer-like metal-insulator-semiconductor-metal sandwich that would be about 0.25 millimeters thick and 0.5 by 0.5 centimeters square. The fragmentary portion of the memory capacitor 10 shown in FIG. 1 would correspond to only several microns in dimension of the order of a few diameters of a finely focussed electron beam.

The memory capacitor sandwich shown in FIG. 1 is comprised by a conductive back layer 11, a semiconductor layer 12, an insulator layer 13 and a conductive front layer 15 all arranged in the order named in the form of a sandwich with the semiconductor layer 12 and insulator layer 13 forming an interface 16. A variety of semiconductor and insulator materials can be employed in fabricating the memory capacitor sandwich shown in FIG. 1. For example, the semiconductor layer 12 could be comprised by Si, Ge, InSb, InAs and GaAs, and the insulator 13 can be comprised by $SiO_2$, SiO, a ferroelectric layer such as $BaTiO_3$, or other suitable insulator having comparable characteristics to those listed. For the purpose of the present description, it will be assumed that the memory capacitor sandwich is formed from p-type silicon (Si) semiconductor material in conjunction with a layer of silicon dioxide ($SiO_2$). The metal layers 11 and 15 may be formed from aluminum however, silver, nickel, gold, or other conductive material may be employed.

The memory capacitor sandwich 10 is connected to a suitable polarizing circuit 21 for applying an appropriate polarizing potential to the memory capacitor sandwich during the various write-read operations as will be described more fully hereinafter. The energy bands of the semiconductor layer 12 are depicted by the lines 32 and 33 where line 32 represents the bottom of the conduction band and line 33 represents the top of the valance band. Similarly, lines 34 and 35 represent the bottom of the conduction band and the top of the valance band in the insulator material 13. Assuming that the semiconductor material 12 is p-type semiconductor, the fermi level through the combined semiconductor insulator is represented by the dashed line 36. Where no charge such as indicated by the + symbol 55 is present in the insulator layer, the energy band lines 32–35 will be essentially horizontal similar to the Fermi level line 36. However, where charges have been written into a bit site location in the manner depicted in FIG. 1 by a writing electron beam 51 from an electron beam source 52 in the presence of a positive polarizing bias potential applied with the switch 23 closed on contact 24, the sandwich will be stressed positively and the conduction and valance band edges indicated by lines 32–35 will be bent downwardly in the manner shown in FIG. 1.

With the memory capacitor memory stressed in the above-described manner at a particular bit site in question, the writing electron beam 51 is directed into the insulator layer 13. For a more detailed description of the different charge states and the mechanism whereby positive charges are induced in the bit site location on the memory capacitor sandwich, reference is made to the above-identified Applied Physic Letters article, and to a copending U.S. Patent application Ser. No. 1,755 filed Jan. 9, 1970, entitled "Slow Write-Fast Read Memory Method And System" by D.O. Smith, K.J. Harte and M.S. Cohen, assigned to the Micro-Bit Corporation.

In order to read-out the memory capacitor, a read-out electron beam 51 is employed having sufficient penetrating power to impinge upon the space charge region 17 of the semiconductor layer 12. Assuming that the semiconductor 12 is a p-type semiconductor, then a space charge or depletion region 17 will be induced in the semiconductor under the charged bit sites adjacent the insulator-semiconductor interface. Within this depletion region, electron-hole pair carriers produced by the read-out electron beam will be swept into the conduction band 32 and the corresponding holes will be swept in the opposite direction by the built-in electric field in the depletion region 17. This creates an electron-hole carrier current of considerable magnitude which charges the area of the capacitor under the bit site and produces an output signal voltage across a load resistor 56 connected across the memory capacitor. This output signal voltage may then be supplied to an amplifier or other suitable utilization device 57 such as a computer. As will be explained more fully hereinafter the electron-hole carrier current produced by impingement of the read-out electron beam within the depletion region 17 should be several orders of magnitude greater than that which would be induced if no space charge region were present in the insulator layer 13 adjacent interface 16. Read-out can be accomplished with little or no bias applied to the memory capacitor sandwich or preferably with a small negative biasing potential by appropriate switching of the moveable switch contact 23 to close on its fixed contact 25 or the center contact 27.

In contrast to the above-briefly described invention, where no positive charges 55 have been stored in the insulator 13 at a particular bit site location, the energy bands within the memory capacitor sandwich 10 will be essentially straight, and no appreciable depletion region 17 will be present in the semiconductor layer adjacent the insulator-semiconductor interface. Because of the absence of the built-in electric field that otherwise would be present in the depletion region, the efficiency of the electron-hole pair separation and carrier collection is greatly reduced under the non-charged bit sites. Hence, the resulting output current produced across load resistor 56 will be considerably smaller in comparison to the output current produced from a charged bit site. For a comparison of the different output current signal levels as well as a more detailed discussion of the read-out mechanisms, reference is again made to the above-mentioned Applied Physics Letters article, and to copending application Ser. No. 1,755 of the United States.

The metal-insulator-semiconductor-metal capacitor memory structure and mechanism described breifly above and in greater detail in the Applied Physics Letter article and copending application Ser. No. 1,755, operates satisfactorily where the center to center spacing of the binary information bit sites is on the order of 200 microns. With a center to center spacing of this magnitude the storage capacity of a resulting memory system employing such memory capacitor becomes economically uninteresting due to increased cost of storage per information bit and increased complexity. To overcome this limitation the present invention makes available a new writing method and apparatus whereby considerably greater data bit storage density is obtained with center to center spacing between the data bit sites on the order of 20 microns or less. To best appreciate how this is accomplished a further analysis of the motion of the charge carriers generated in the semiconductor layer by the reading electron beam during read-out is required.

It is in the interpretation and proposed theory of operation of how the different resulting output current pulses are produced that the prior method and techniques fail to provide unambiguous read-out with closely spaced information bit sites. To better understand this failing, the steady state properties of the memory capacitor sandwich under various gate biases and various insulator charge conditions will be considered in greater detail. The particular memory capacitor sandwich structure which will be referred to is comprised by a 500 A layer of aluminum evaporated on a 1,700 A unit layer thickness of thermally grown silicon dioxide insulator on a p-type silicon substrate having a resistivity in the range of 0.2 to 20 ohm centimeters and an ohmic contact forming the bottom metal conductor. It should be emphasized, that the memory is in no way limited to use with a structure fabricated in this manner and having these characteristics, and is not critically dependent upon the various layer thicknesses which are cited as exemplary only.

For the purpose of the following discussion, it will be assumed that binary "1" data bits are indicated by a positive charge condition at the data bit site. Assuming that this charge is saturated or nearly saturated (i.e., about $10^{13}$ positive charges per $cm^2$) and that the gate to substrate biases are more positive than −30 volts, then the positive charges written into the insulator force the surface of the semiconductor at the insulator-semiconductor interface into inversion. This is to say that the surface layer of the p-type silicon semiconductor at the oxide-silicon interface becomes strongly n-type and highly conductive. Just beneath this highly conductive, strongly inverted layer a depletion region will be formed which is essentially free of charge carriers. This depletion region supports a high electric field perpendicular to the insulator-semiconductor interface. The dimension of this region perpendicular to the interface is determined solely by the resistivity of the semiconductor and beneath the depletion region is the bulk, field-free, p-type silicon semiconductor.

Consider now the charge condition at the binary "o" non-charged bit sites where not all of the positive charge stored at the insulator-semiconductor interface can be removed by negatively biasing the memory capacitor sandwich during irradiation by the writing electron beam. Typically, of the order of $10^{12}$ positive charges per square centimeter remain at the non-charged bit sites. For read-out bias potentials in the range from 0 to −10 volts, the surface of the silicon semiconductor at the insulator-semiconductor interface may be weakly inverted, depleted, or weakly accumulated depending on the value of the bias voltage applied and history of insulator charging. Weak inversion means that the surface becomes weakly n-type and not highly conducting. Depletion has been defined briefly above and weak accumulation means that the surface may be slightly more p-type than the bulk silicon substrate and hence slightly more conducting. The important point to stress is that in the non-charge condition, the surface of semiconductor at the insulator-semiconductor interface is not strongly inverted (or strongly accumulated) and thus not highly conductive.

It is now necessary to consider the motion of the charge carriers generated in the semiconductor by the reading electron beam (and thus the current delivered by the memory capacitor to an external circuit) under each of the above described charged and non-charged conditions. In this discussion, it is important to note that though an electron beam with an initial energy of say 5 to 10 kv. and 50 nanoamperes beam current, loses a considerable portion of this energy in penetrating the metal layer and the oxide insulator layer, the electrons still retain sufficient energy to generate many electron-hole pairs in the silicon semiconductor substrate. Potentially, if all of the generated electron-hole pair carriers contributed to the current delivered by the memory capacitor to an external circuit, an output current of several orders of magnitude larger than the induced electron beam current would be observed.

If all of the insulator layer at a bit site is charged (i.e., the charge is saturated or nearly saturated with about $10^{13}$ positive charges per $cm^2$) the p-type silicon at the oxide-silicon interface is in strong inversion. Electron-hole pairs generated in the inversion and depletion region of the silicon semiconductor by the reading electron beam separate in the electric field, the holes go to the bulk silicon and the electrons are drawn toward the interface. Any current carriers generated in the bulk silicon which are in an essentially field-free region would not contribute to an output current. Once the electrons reach the highly conductive inversion layer at the interface, they spread out readily from the immediate bit site area into which the electron beam is probing due to the high conductivity of the grid-like inversion layer surrounding all the bit sites, and hence do not accumulate just in the area of the data bit site being probed by the electron beam. As a consequence all of the capacitor surface interconnected with the highly conductive grid-like inversion layer can be charged and not just the area under the electron beam probe. The memory capacitor will be charged until competing carrier recombination mechanisms prevent further charging. Hence, the output current observed across the capacitor will be a peaked function of the order of 50 microamperes for a 50 nanoampere reading electron beam. It is this effect involving the capacitor charging current of a substantial portion of the capacitor surface via the semiconductor inversion layer lattice which is neglected in the prior disclosures.

Consider now the readout of a non-charged binary "0" bit site having the features described above where there is no highly conductive inversion layer induced into the surface of the silicon immediately under the non-charged bit site. Because of the absence of the highly conductive inversion layer, electrons generated in the silicon semiconductor by the reading electron beam cannot spread out to charge a substantial surface area of the memory capacitor in the manner described above with respect to the positively charged binary "1" bit sites. In contrast, the electron carriers generated by the electron beam under the non-charged bit sites are confined to a region at the surface of the silicon semiconductor which is only slightly larger than the cross sectional area of electron beam. This concentration of electrons quickly destroy any depletion layer field that exists and the beam generated electron and hole carrier can no longer be separated in the manner described in the above-referenced Applied Physics Letters article. Typical output signals derived from the non-charged binary 0 bit sites are of the order of 0–10 microamperes for a 50 nanoampere reading electron beam current. The exact magnitude of the output signal depends on the gate bias and just how much remanent charge is present in the oxide insulator as a result of its prior history. The important point is that the output current from a non-charged binary "0" bit site is at least a factor of 5 less than the output current obtained from the memory capacitor when a binary "1" charged bit site is probed.

Figure 3:
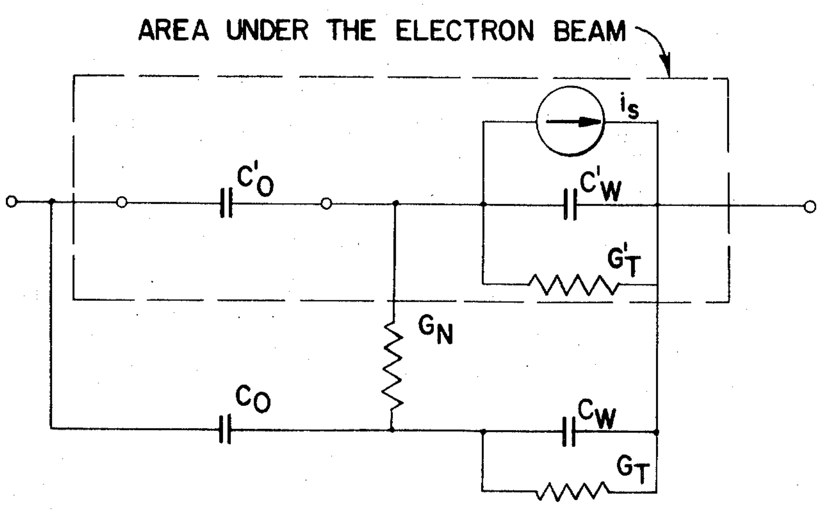
FIG. 3 is a schematic diagram of a circuit model of the metal-insulator-semiconductor-metal memory capacitor sandwich that is helpful in illustrating the manner of operation of the memory capacitor according to the invention.

FIG. 3 of the drawings is a schematic circuit diagram illustrating an approximate linearized circuit model of the metal-insulator-semiconductor-metal memory capacitor sandwich and its manner of operation for very low intensity electron beams as described briefly above, and is useful in visualizing the device behavior under the two different charge states. The various circuit components illustrated in FIG. 3 are as follows:

- $i_s$ = Current from electron-hole pairs produced by the electron beam in the depletion layer
- $C'_O$ = Capacitance of the oxide under the area hit by the electron beam
- $C'_W$ Capacitance of the depletion layer under the area hit by the electron beam
- $G'_T$ = Recombination conductance under the area hit by the electron beam
- $G_N$ = Inversion layer conductance
- $C_O$ = Capacitance of the oxide excepting the area hit by the electron beam
- $C_W$ = Capacitance of the depletion layer excepting the area hit by the electron beam
- $G_T$ = Recombination conductance excepting the area hit by the electron beam In FIG. 3, the current generator $i_s$ is meaningful only if there is a depletion layer that produces separation of the electron-hole pair carriers induced by the impingement of the electron beam into the semiconductor region. As mentioned above, in the non-charged condition the depletion layer (if one exists under the non-charged bit) would be quickly destroyed by the generated carriers, or if the device is in accumulation or weakly inverted during reading there would be no depletion layer. This would be of importance in distinguishing binary "1s" from binary "0s" i.e., charged condition from non-charged condition. The latter situation will be explained more fully hereinafter in connection with a memory sandwich fabricated from n-type semiconductor. For the present purposes, however, it is sufficient to keep in mind that we are discussing a p-type semiconductor where a depletion region is produced under the charged binary 1 bit sites. The pertinent circuit element of the circuit model shown in FIG. 3 which changes for the two different charge conditions is the current generator $i_s$. For the positively charged binary 1 bit sites $i_s$ is large. Under the non-charged binary 0 bit sites, $i_s$ is small.

If one attempts to operate a memory capacitor as described in the above referenced Applied Physics Letters article and copending application Ser. No. 1,755, for bit site spacings less than about 200 microns, the output current may or may not indicate charge state of the insulator at the bit site. To be particular, suppose that for the assumed memory capacitor using p-type semiconductor and $SiO_2$ insulator, positive charges are placed in the $SiO_2$ layer at selected spots for binary "1s" and charge is removed from the oxide layers at other spots for binary "0s." Suppose further that these bit sites of binary information do not overlap in the oxide layer, and that the charge state elsewhere in the oxide layer remains indeterminate. If the bit sites are large (typically greater than about 200 microns in diameter) then the output current pulses resulting when the binary "1" areas are bombarded with a reading electron beam having a diameter $d$ on the order of 200 microns will be larger than when the binary 0 bit sites are bombarded. This will be due to the mechanism described above and illustrated in the circuit model of FIG. 3. However, if the bit sizes are smaller (e.g. 30 microns in diameter or smaller) the amplitude of the output current pulses produced during readout with a similar size reading electron beam will not have a high correlation with the states of charge in the oxide insulator layer at the bit sites thereby resulting in an ambiguous read-out.

Under the conditions defined in the preceding paragraph, the output current from a bit site (whether it is either a positively charged binary 1 or a non-charged binary 0) in an area of the oxide insulator layer which for the most part has positive charges in the surrounding areas adjacent the bit site, will be large like the output from a positively charged binary 1. Conversely, the output from a bit site in a region of the oxide with little or no positive charge in the areas surrounding the bit site will be like the output from a non-charged binary 0. Thus, for bit sites having small center to center spacing distances on the order of 20 microns or less, the output current produced from a bit site on interrogation depends not on the oxide insulator charge of the bit site directly under the reading electron beam but instead depends mainly on the oxide charge of the surrounding area. This is due to the fact that if the oxide charge of the surrounding area is primarily positively charged, the reading electron beam will produce electron-hole pair carriers under conditions where the electrons have access to a relatively large area of highly conducting inverted layer thereby resulting in a large capacitor output current. In contrast if the surrounding area is primarily non-charged the electron beam induced electrons will not have access to any extensive highly conductive, inversion layer resulting in little or no capacitor charging current.

The above stated explanation is applicable to a capacitor memory fabricated from p-type semiconductor. If the capacitor memory is fabricated from n-type semiconductor the reverse situation will exist. To be explicit, with an n-type semiconductor, during read - out it is necessary to employ a relatively large negative voltage (on the order of minus 30–40 volts) across the capacitor in a direction such that the insulator layer is negative with respect to the semiconductor. Under such conditions a weakly accumulative layer will be formed under the positively charged bit sites in the insulator layer, and the strongly inverted conducting layer and corresponding depletion regions will be formed under the non-charged areas of the insulator. Under these conditions, it will be appreciated that the reverse situation of that described above occurs with respect to capacitor memories using n-type semiconductors during the read-out operation. The writing operation for writing charged and non-charged bit sites into the insulator layer is the same for both n-type and p-type semiconductors.

Figure 2:
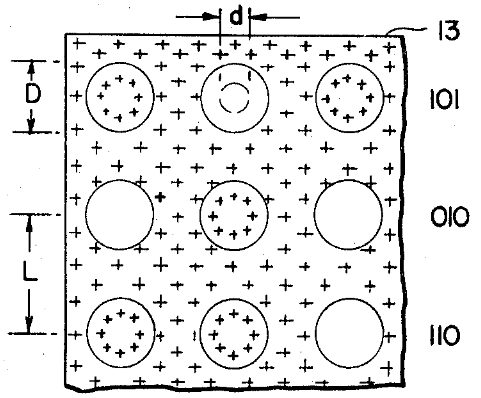
FIG. 2 is a diagramatic sketch of an enlarged planar view of a portion of the surface of an insulator-semiconductor memory capacitor and depicts certain critical spacing parameters required in practicing the invention.
Figure 4:
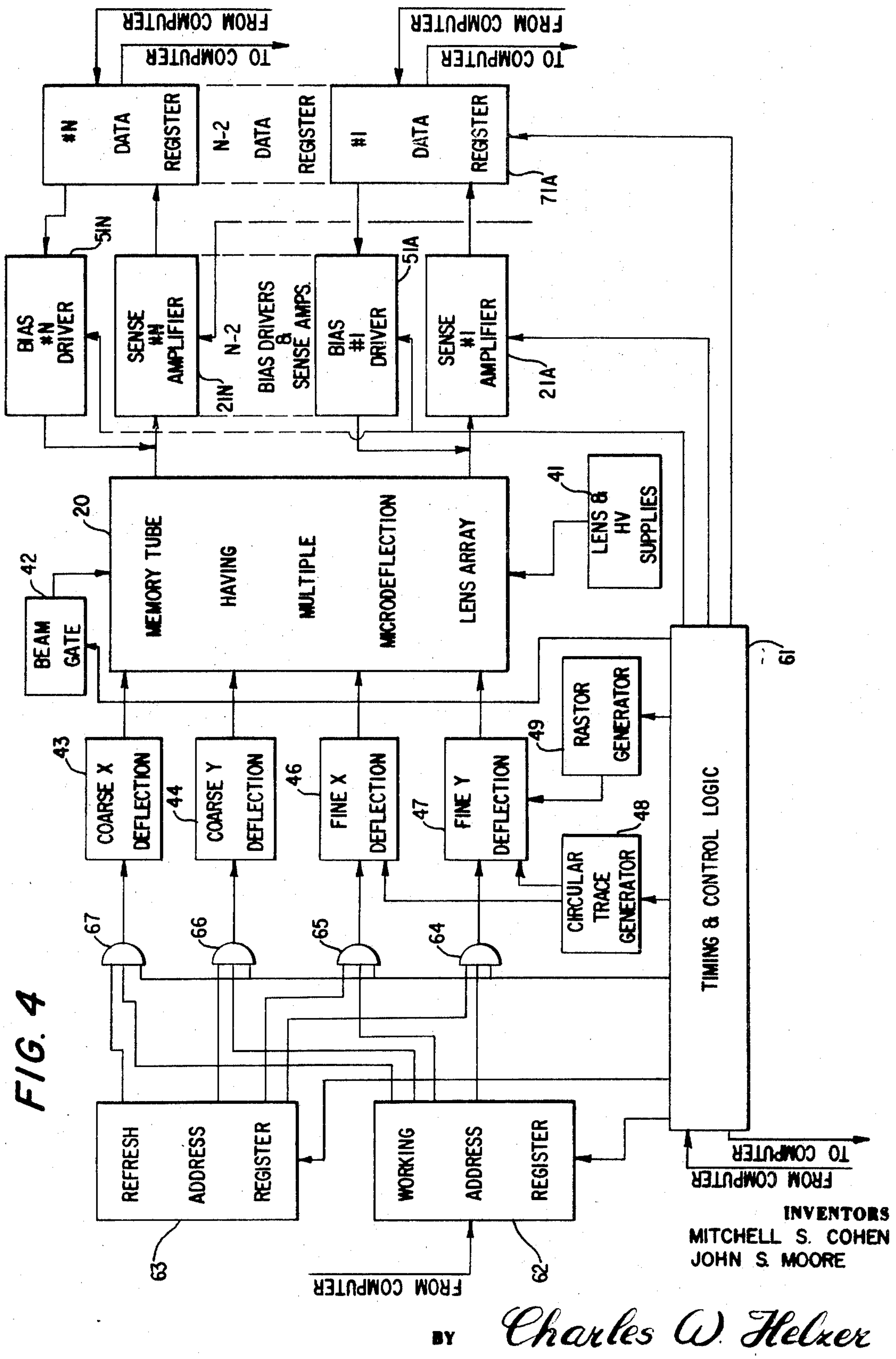
FIG. 4 is a functional block diagram of a computer memory system constructed in accordance with the invention and illustrates a known practical method for practicing the invention.
Figure 5:
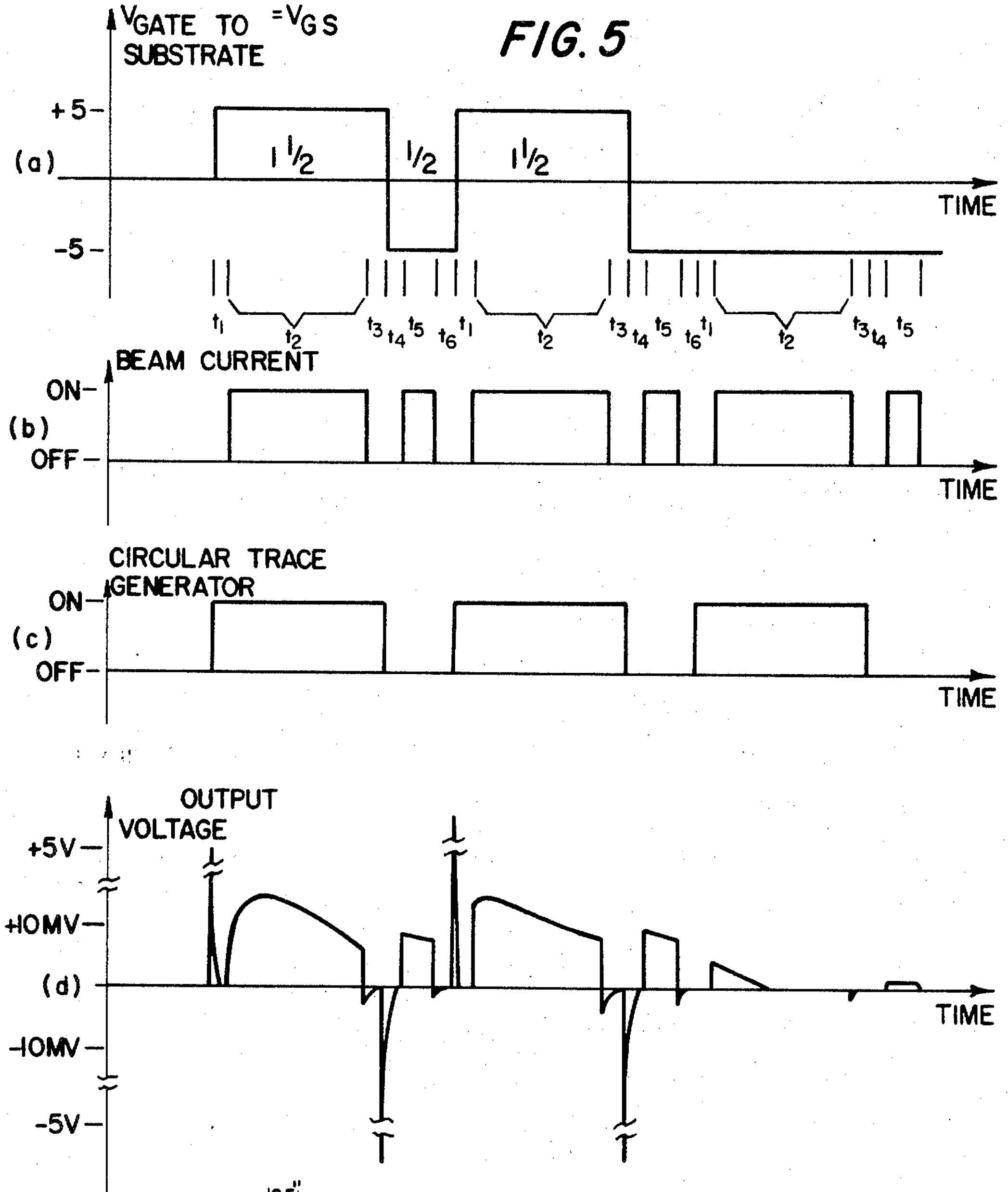
FIG. 5 is a series of characteristic curves illustrating the waveform of certain bias voltages, beam current, output signal and on-off operating characteristics of parts of the system shown in FIG. 4.
Figure 6:
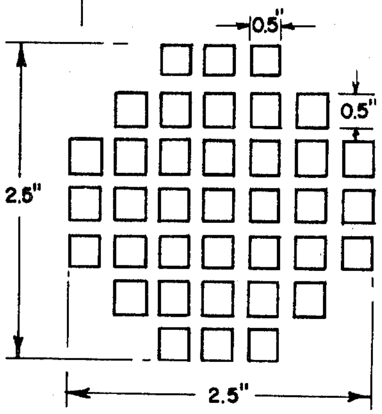
FIG. 6 is a diagramatic layout of a plurality of metal-insulator-semiconductor-metal memory capacitors used with the system of FIG. 4.

An improved method of operating metal-insulator-semiconductor-metal capacitor memories with small data bit dimensions and close bit spacing in accordance with the invention, is illustrated in FIG. 2 of the drawings, and an improved apparatus for practicing the method of FIG. 2 is illustrated and described with respect to FIGS. 4–6. With this improved method and apparatus using a memory capacitor employing p-type semiconductors, electric charge is uniformly placed over the entire surface of the insulator at the insulator-semiconductor interface. That is to say, binary ones are written everywhere assuming that a binary "1" is depicted by a positively charged condition in the insulator layer. At selected points not less than a distance L (e.g., 20 microns) apart, the positive charge is removed over an enlarged regions of extent D corresponding to area of diameter D<L e.g., 10 microns) to form the non-charge binary "0" bit sites. Removal of the charge at the binary "0" bit sites is accomplished in the manner described briefly above and in greater detail in the Applied Physics Letter article and copending application Ser. No. 1,755. In addition, during the writing in of the binary "0" (removal of positive charge) the writing electron beam is appropriately manipulated by means 53 shown in FIG. 1 to form the enlarged regions of extent D corresponding to areas of diameter D (e. g. 10 microns) while maintaining a negative polarity gate bias with the metalized insulator layer negative with respect to the semiconductor layer. Manipulation of the electron beam may be accomplished by the defocusing of the writing beam from its normal 5 micron diameter to the 10 micron diameter; however, it is preferred that the writing beam be maintained at its normal 5 micron diameter and then caused to trace a circular path in the form of a doughnut around each bit site with this circular path or doughnut having a diameter on the order of 10 microns. Other techniques for manipulating the electron beam in order to form the enlarged regions of extent D will be suggested to those skilled in the art in the light of the present disclosure.

As a result of the above writing procedures, it will be seen that there will be an area of insulator (due to the fact that L equal 20 microns and is greater than D) surrounding all of the data bit sites which is positively charged. This area forms an interconnected, grid-like, lattice of positive charges throughtout the insulator surface. At the points where positively charged binary "1s" are written, the memory capacitor is positively biased with the insulator positive with respect to the semiconductor and the writing electron beam again appropriately manipulated through its circular trace path of 10 microns diameter thereby writing in positive charges which are sure to be interconnected with the grid-like lattice of interconnected charges throughout the surface of the memory capacitor. These positive charges in turn result in the inducing of a highly inverted, highly conducting layer at each bit site which is interconnected with the pre-existing highly conductive grid-like lattice layer in the surface of the semiconductor at the insulator-semiconductor-interface. In contrast to the positively charged binary 1 bit sites, the non-charged binary 0 bit sites are surrounded by an area of diameter D where the diameter D is chosen to be the equivalent to or greater than several electron path diffusion lengths in the semiconductor layer and assures that electrons generated by the reading electron beam recombine prior to reaching the highly conducting grid-like inverted lattice layer.

It is desirable that the electron diffusion lengths in the semiconductor be minimized to greatest possible extent so as to enhance electron-hole pair carrier recombination in the non-charged areas of diameter D. For this purpose gold doping may be used by subjecting the silicon semiconductor to a gold diffusion process from the back of the silicon after the $SiO_2$ oxide layer has been grown but before the aluminum conducting layer has been evaporated over the front side of the insulator. Specialized doping is a standard method of reducing electron lifetime and diffusion lengths in semiconductors and is well known and used throughout the semiconductor industry. Another method of reducing the electron diffusion path lengths at the surface of the silicon semiconductor is to introduce large quantities of electron recombination centers (sometime referred to as interface states) in the oxide insulator layer at the oxide-silicon interface. This can be accomplished by annealing the oxidized silicon waffer for several hours in an oxygen atmosphere at high temperatures on the order of 800°C. Such procedures for introducing interface states in oxide-silicon wafers also are well known in the semiconductor industry.

FIG. 2 is a plan view of a fragmentary corner of a metal-insulator semiconductor-metal memory sandwich which has been processed during writing in the above described manner. As shown in FIG. 2, the surface of the insulator 13 at the insulator-semiconductor interface has been uniformly charged with positive charges over its entire surface so as to produce a saturation charge condition having on the order of $10^{13}$ positive charges per square centimeter. This may be accomplished by placing the electron beam writing apparatus in a flood mode or alternatively to cause it to raster scan over the entire surface of the memory capacitor while maintaining a positive bias across the capacitor of the order of a few volts. Thereafter, the electron beam probe of diameter $d \approx 5$ microns is deflected sequentially to each bit site where each bit site has a center to center spacing distance L. In FIG. 2 it is assumed that the columns and rows of bit sites there illustrated are equally spaced apart by the distance L. At each bit site the writing electron beam is appropriately manipulated as described above to trace out the increased or enlarged region of extent D corresponding to an area of diameter $D > d$ and where $D < L$. At bit sits where binary "1's" are to be written, the memory capacitor is positively biased to result in the interconnected positively charged areas, and at bit sites where a non-charge binary 0 is to be written the memory capacitor is negatively biased while manipulating the writing electron beam over increased diameter area D. The resulting binary information written into the insulator layer is shown to the right of FIG. 2 wherein it is seen that in the upper row a 1–0–1 is written, in the middle row 0–1–0 is recorded and in the bottom row a 1–1–0.

During read-out of a memory processed in the above described manner, the data stored at each of the data bit sites is retrieved as follows. The metalized insulator to semiconductor substrate bias is set between 0 and −10 volts so that the silicon surface under the areas of the positively charged oxide insulator will be in strong inversion, and the remaining non-charged binary "0" bit sites will be at most weakly inverted but not highly conductive. The reading electron beam of diameter $d$ then accesses the information bit sites. If this reading electron beam hits a positively charged bit site, a large output current (typically about 50 microamperes) will be produced across the memory capacitor. In contrast, if the reading electron beam hits the center of one of the non-charged binary 0 areas from which the oxide insulator charge has been removed, the resulting output current will be considerably smaller usually less than 10 microamperes. Thus, it will be seen that there is an unambiguous determination of the charge state of the oxide insulators at the selected information bit sites.

The theory behind the above briefly described method of operation is as follows. There can only be a large output charging current produced across the memory capacitor under conditions where the beam hits a region of the oxide insulator which is surrounded by a large interconnected area of the oxide insulator that is positively charged. Thus, by uniformly placing positive charges over the entire surface of the oxide insulator and removing the positive charge at only those bit sites where zeroes are desired, the production of a large capacitor charging output current at the positively charged bit sites will be assured thereby providing an unambiguous and distinctive read-out of the binary 1 bits. Since the diameter of D of the binary 0 bit sites is less than the closest spacing L of the "0" bit sites there is always an interconnected lattice of positively charged oxide insulator regardless of how many binary "0" bits there are in the data being recorded. This scheme insures that when the reading electron beam hits a positively charged binary 1 bit site in the oxide insulator, the electron carrier current induced under the bit site will be interconnected with and have access to a large area of the highly conductive inverted silicon semiconductor disposed under the corresponding grid-like lattice of positively charged oxide insulator. Hence, a large area of the memory capacitor sandwich is accessed, and results in the production of a large output charging current that is distinctive of the positively charged binary 1 bit sites.

If the reading electron beam hits the center of a non-charged binary 0 bit site, the electrons generated in the silicon semiconductor under the reading electron beam are not allowed to spread out to the edge of the non-charged binary 0 area of the extent D where they could interact with and connect to the strongly inverted and highly conducting lattice layer of semiconductor. This is due to the fact that the extent D of non-charged enlarged regions representing binary "0's" is chosen to be of the order of several electron diffusion path lengths greater than diameter *d* of the reading electron beam. Thus, electrons generated in the silicon semiconductor by the reading electron beam recombine before they diffuse to the highly conducting inversion layer. When the electrons undergo "recombination" they are no longer available to conduct electricity. Hence, the electrons generated by the reading electron beam can only charge that area of the oxide insulator-semiconductor interface under the beam. As a consequence, at most a minimal output charging current is sensed across the memory capacitor. It might be noted that in practice some of the electrons generated at non-charged binary - bit site may get to the inversion layer where they can contribute to charging large areas of the memory capacitor. However, the ratio of the reading electron beam extent *d* to the diameter D of the enlarged regions is chosen so that a sufficient number of these electrons recombine before they reach the highly conducting inversion layer. As a result, the requisite difference in amplitude in the output charging current pulse from the positively charged binary 1 and the non-charged binary 0 bits is maintained. Through the use of appropriate gold doping and or annealing in oxygen atmosphere at high temperatures as described above, the diffusion of electrons generated by the electron beam from the non-charged binary 0 areas to the highly conducting inversion layer can be further impeded, thus improving the binary 1 and binary 0 output pulse discrimination.

It should be noted at this point in the description that the reverse of the situation shown in FIG. 2 and described above would be true if the underlying semiconductor substrate were n-type semiconductor. That is to say, if the semiconductor were n-type the surface of the memory capacitor shown in FIG. 2 would be uniformly non-charged. Similarly, if it is desired that the binary 1 bit sites be represented by a large charging output current pulse as opposed to a negligible or no output current pulse for the binary 0 bits, then the binary 1 areas would be represented by a non-charged condition that would be interconnected with the uniformly non-charged interconnected grid-like lattice spread throughout the surface of the insulator layer. Conversely, the zeroes would be represented by positively charged areas. Similar to the above described technique however, the positively charged 0 bit sites would again be of extent D<L.

During read-out of such a n-type semiconductor memory a read-out bias potential on the order of −30 to −40 volts is required in order to induce the necessary inversion region in the semiconductor layer under the non-charged regions of the insulator. With respect to the positively charged bit sites, at most a weakly accumulated region will be produced. As the read-out electron beam probes the non-charged binary 1 bit sites, the resultant electron carrier current accesses to and is interconnected with the highly inverted, highly conductive grid-like lattice layer thereby resulting in the production of a large output current pulse. Upon impinging into the positively charged binary - bit sites, however, electrons produced by the reading electron beam are prevented from accessing to the highly conductive grid-like inverted lattice layer, and hence recombine within the area of extent D which is equivalent to or greater than several electron diffusion path lengths in the semiconductor. Consequently, at most only a minimal output current will be produced that is readily distinguishable from that produced at the non-charged binary 1 bit sites in the memory capacitor employing n-type semiconductor.

An important point to note in the above description is that the state of charge in the oxide insulator directly under the reading electron beam is of little or no importance in the operation of the memory capacitor with close bit spacing as written above. What is important is the charge state of the oxide insulator in the area of extent D immediately surrounding the point of impact of the reading electron beam. It is the charge state of this immediate area of extent D surrounding the point of impact of the reading electron beam that determines the amplitude of the output current. If the charge state of the immediate surrounding area is such as to allow the electrons induced in the semiconductor by the electron beam to access to a large area of the underlying grid-like highly conductive inverted lattice layer, a large capacitor charging current will result. However, if the immediate surrounding area provides no suitable conductive current path for the electrons produced by the reading electron beam, they will tend to recombine within the several electron diffusion path lengths within the area of extent D thereby resulting in at most only a minimal output charging current pulse. This means that the charge state of the oxide insulator under the impact point of the reading electron beam is of no great consequence and can be chosen at will. This feature has an important implication when considering how to best operate the memory in order to minimize interaction between the information bit sites as will be described more fully hereinafter.

In memory systems employing metal-insulator-semiconductor-metal memory capacitor sandwiches, there is no significant interaction between the data bit sites via the capacitor structure itself. However, the writing and reading electron beam is not infinitely well defined and, although the great majority of electrons in the electron beam are confined to the central axis of the beam, there will always be some which do not fall in this area. Hence, there will always be some of the electrons from the writing and reading electron beam which are scattered at random over the surface of the memory capacitor sandwich. Over a period of time and number of operating cycles, the integrated effect of these scattering electrons could charge or discharge large areas of the memory capacitor. In order to minimize the scattering effects of these random electrons, the techniques described in the following paragraphs is employed.

A proposed method of minimizing the effect of random scattering electrons is to keep track of how much random positive charge is being placed in the insulator during writing and at a subsequent point take steps to remove an equivalent amount of random scattering positive charge. Similarly, during read-out where the memory capacitor is negatively biased some positive charge will be removed from the insulator as a result of random scattering electrons. By keeping rack of the amount of positive charge removed, and at a subsequent point replacing an equivalent amount of positive charge, the long term degrading effects of the random scattering electrons can be compensated for. This is accomplished in the following manner.

Assuming that the memory capacitor sandwich employs p-type silicon, then initially positive charge is placed everywhere in the oxide insulator at the beginning of the writing cycle. Then non-charged 0 bit sites are written at selected data bit sites in accordance with the data to be recorded. During the writing of the binary zeroes the substrate potential is kept negative, and as a result the desired background of positively charged oxide insulator forming the interconnected grid of positive charges surrounding all of the bit sites will tend to discharge due to random scattering electrons. To compensate for this, if for each binary 0 bit that is written by having positive charge removed from an area of diameter D while biasing the capacitor structure negatively during bombardment, one then subsequently reverses the bias across the capacitor so that it is positive and bombards only an area of diameter d< of extent D centered in the non-charged area D for an equivalent time, then the region will still look like a binary 0 when it is subsequently read-out by the reading electron beam of diameter area d since the charge state of the oxide insulator directly under the point of impact of the reading electron beam has no bearing on the output current pulse produced across the memory capacitor as described above. More importantly, however, the ratio of the length of time that the device is bombarded with negative bias to the length of time that it is bombarded with positive bias can be adjusted so that the random scattering electrons far from the central writing beam will replace as much positive charge during the subsequent bombardment of central area *d* as was removed during the original writing of area of extent D. This process is repeated each time that a non-charged binary 0 is written so that there is no tendency to discharge adjacent bit sites or other areas of the oxide insulator which should retain positive charge.

The above described symmetrizing process also is carried out during the writing of positively charged binary 1 bit sites. Here again, with the memory capacitor positively biased, the electron beam is deflected to impinge upon the selected bit site, and then is manipulated to write in a positive charge by appropriate circular trace deflection, defocusing or the like within an area D. If the bit site already is positively charged, this merely assures saturation charging and interconnection with the grid-like lattice of positive charges previously recorded as a result of the uniform charging step. Subsequently, the writing electron beam is centered in the binary 1 bit site and the bias across the memory capacitor reversed to provide a negative bias whereby the effect of random scattering electrons far from the central beam is compensated.

During read-out of the memory capacitor, the symmetrizing process described above again can be performed. The read-out electron beam of diameter *d* is centered at each data bit sites being sequentially read-out while the memory capacitor sandwich is negatively biased. During this read-out phase the output from the memory capacitor sandwich will be gated through suitable gating circuitry to an appropriate output device such as the data storage unit. Subsequently, at the data bit site being read-out, the bias across the memory capacitor is reversed so that it is positively biased, and the same data bit site is again bombarded for an equivalent period of time as that employed in the preceding read-out phase. Hence, as many random scattering electrons that were produced during the read-out cycle of the data bit site with negative bias across the memory capacitor also will be produced during the subsequent symmetrizing cycle with the positive bias so as to minimize to the greatest possible extent interaction on adjacent bit sites and the charged areas of the interconnected grid-like lattice surrounding the data bit sites. Assuming that the rate of oxide insulator charging and discharging is a linear function of electron beam charge density and the bias potential across the memory capacitor, then the order in which these symmetrizing processes are carried out will not be of too great importance.

Another feature that can be employed to overcome the effect of random scattered electrons far from the center of the focussed beam, is to optimize the density per square centimeter of the Al or other metal layer covering the surface of the insulator exposed to the action of the electron beam. It has been observed that if the upper metal layer is Al and is too thin on the order of 500 A or less, then disturb effects are experienced due to multiple reflection and back scatter electrons, and reflection of a portion of the main beam back and forth between the memory capacitor and other surfaces within the electron optical column. To suppress disturb effects of this nature, the top or upper Al metal layer should be increased in thickness to the order of several thousand A. Alternatively, a different metal can be used having an area density of the order of 50 micrograms/$cm^2$. Also of low backscatter coefficient such as carbon can be used to coat the reflecting surfaces in the electron-optical column. It will be appreciated that the increased density/$cm^2$ forces the reflected electrons to lose some energy upon passage through the upper metal layer so that after multiple reflections they do not have sufficient energy to penetrate back through the metal film to the underlying oxide insulator. Needless to say, increased upper metal layer density also tends to attenuate the primary electron beam so that an optimum thickness on the order of 2,000 A ± 500 A for Al has been determined to provide a reasonable comprise to the conflicting demands on the upper metal layer thickness where Al is employed.

FIG. 4 is a functional block diagram of a memory system constructed in accordance with the invention and designed to record and read-out binary data in the manner described with relation to FIGS. 1–3. In FIG. 4 a memory tube having a micro deflection assembly is shown at 20. The memory tube 20 may be similar in construction to the memory tube 20 disclosed in pending U.S. Patent application Ser. No. 19,379, filed Mar. 13, 1970 for a "High Speed-Large Storage Capability Electron Beam Accessed Memory Method And Apparatus" - D.O. Smith, M.S. Cohen, K.J. Harte, S.P. Newberry and D. Speliotis, assigned to the Micro-Bit Corporation. For a more detailed description of the construction and operation of the memory tube 20, reference is made to copending application Ser. No. 19,379. Briefly, however, it can be said that the memory tube 20 includes a plurality of micro deflection lenslets (sometimes referred to as a fly's-eye lens) which are arrayed in a plane transverse to the electron beam path. An electron beam produced by an electron source is focused into a finely collimated beam and coarse deflected by a coarse deflection system to a selected one of the micro deflection lenslets. The micro deflection lenslets may be arrayed over selected ones of a plurality of metal-insulator-semiconductor-metal memory capacitors such as shown in FIG. 1 and arrayed in octagonal pattern as illustrated in FIG. 6. The entire array of memory capacitors is arranged in an octagonal pattern having a maximum dimension of the order of 2 ½ inches by 2 ½ inches and may be comprised of individually fabricated memory capacitors or they may be fabricated on a common semiconductor substrate using well known microcircuit techniques. It is of course possible to arrange the memory capacitors in a square pattern of columns and rows in a manner similar to the arrangement of the bit sites shown in FIG. 2. Alternatively, it may be desirable to arrange the data bit sites in some pattern different from FIG. 2, such as a hexagonal pattern, or some other suitable configuration designed to optimize storage density with minimum spacing between information centers.

Within memory tube 20, the finely focussed electron beam produced by the electron source will be roughly deflected into the field of one of the fine micro-deflection lenslets by the coarse X–Y deflection lens assembly which may comprise staggered electromagnetic yokes for assuring that the electron beam enters a selected micro deflection lenslet on a path that is substantially at right angles to the plane of the lenslet. If electrostatic coarse deflection plates are employed, an accelerating lens can be used for this same purpose. The selected micro deflection lenslet than causes the electron beam to be deflected to a desired information bit site by the application of appropriate fine X–Y deflection signals to the micro-deflection electrodes of the lenslet.

As the electron beam is caused to trace across the surface of a selected memory capacitor from bit site to bit site by the fine X–Y deflection system, the beam is gated on and off by a beam gating control circuit 42 connected to the control grid of the electron gun in tube 20. Suitable excitation and centering potentials are supplied to the electron gun, the focusing lens, the course deflection lens assembly and the micro deflection lenslets from a lens and high voltage power supply 41. The appropriate coarse X and Y deflection signals are supplied to the coarse X and Y deflection lens assembly of tube 20 from coarse X deflection control circuit 43 and coarse Y deflection control circuit 44. Similarly, the fine X and Y deflection control signals are supplied from the fine X and Y deflection control circuits 46 and 47. Each of these deflection control circuits comprise essentially digital to analogue interface circuits for receiving input digitally encoded position command control signals from a computer system with which the memory is used, and converting these input command signals to appropriate analogue deflection voltages or currents designed to deflect the electron write-read beam of tube 20 to an appropriate addressed site on a selected one of the memory capacitors.

For the purpose of supplying the digitally encoded deflection control signals to the coarse and fine X and Y deflection control circuits 43–47, a working address register 62 is provided which receives its instructions from the computer system with which the memory is employed. The working address register 62 in turn has its output supplied through suitable AND gates 64–67 to each of the coarse and fine X and Y deflection circuits 43–47. In addition to the digitally encoded deflection address control signals, the AND gates 64–67 are supplied with enabling potentials from a timing and control logic circuit 61, and from a refresh address register 63. The purpose of the refresh address register 63 will be explained more fully hereinafter, however for, the present purpose it it sufficient to point out that during periods when the computer is using the memory tube 20, the refresh address register 63 merely serves to enable the AND gates 64–67 so as to supply the digitally encoded addresses from working register 62 to the coarse and fine X and Y deflection control circuit 43–47. During periods of non-use by the computer system, the refresh address register 63 takes over and controls operation of the coarse and fine X and Y deflection control circuits 43–47 so as to read and rewrite the data-bit sites in a refreshing operation.

The timing and control logic circuit 61 is designed to both receive instructions from the computer system and to supply instructions back to the computer system in order to communicate to the input-output equipment of the computer system the fact that requested information to be stored in memory has been recorded, read-out, etc in accordance with command instructions. In addition to controlling operation of both the working address register 62 and the refresh register 63 and supplying enabling potentials to the gates 64–67, the timing and control logic circuit 61 also controls operation of a circular trace generator 48 whose output can additionally control the operation of the fine X and Y deflection control circuits 46 and 47. Upon activation the circular trace generator 48 via the fine X and Y deflection control circuits 46 and 47, will cause the writing electron beam having a diameter d of approximately 5 microns to trace out a circular path at a selected bit site on the planar surface of one of the memory capacitors of diameter D of the order of 10 microns. Other apparatus for forming the enlarged regions of extent D corresponding to a circular area of diameter D will be suggested to those skilled in the art. In a similar manner a raster generator 49 is connected to control the operation of the fine X and Y deflection control circuits and in turn is controlled by the timing and control logic 61. Upon the raster generator 49 being activated, the fine X and Y deflection control circuits will cause the writing electron beam to raster scan across the entire surface of one of the memory capacitors under the micro deflection lenslet activated by coarse deflection of the electron beam to that lenslet by coarse X and Y deflection control circuits 43 and 44.

The timing and control logic circuit 61 also controls application of suitable polarity biasing potentials across the respective memory capacitor elements during the write-read operations. This is accomplished by means of a plurality of bias driver circuits 51A–51N connected to apply either a positive or negative voltage gradiant of known magnitude across the respective memory capacitors. For this purpose, there is a driver circuit for each memory capacitor and the timing of its operation is under the control of the timing and control logic circuit 51. Information as to the proper polarity to be applied across each of the respective memory capacitors at a given data bit site is supplied to the bias driver circuits 51A–51N from the respective input-output data register 71A–71N connected to receive input data to be written into the memory from the computer system, and to supply output data read-out of the memory system back to the computer. The data registers 71A–71N may comprise conventional data storage registers of the type employing interconnected flip-flop circuits capable of storing on the order of one word of suitably encoded binary data such as decimal coded binary data. To control operation during writing and reading, the timing and control logic circuit 61 provides sequentially timed control signals to selected ones of the data registers 71A–71N. The timing and control logic circuit 61 also controls operation of the output sense amplifiers 21A–21N for each of the respective memory capacitors so as to cause the selected sense amplifier to supply output data signals to its respective data register 71A–71N at selected points during the reading operation, and to gate off the output sense amplifier during parts of the reading cycle and during the writing operation. The bias drivers 51A–51I and sense amplifiers 21A–21N may be of any known construction capable of applying the required biasing potentials within the switching periods available and having response characteristics suitable for processing the signals being read-out.

During a writing operation, the input-output equipment of the computer will supply to the selected data registers 71A–71N the data to be recorded in a selected memory capacitor a word at a time. Simultaneously, the computer will inform the timing and control logic circuit that it wishes to write the data into the memory system, and will supply the address of the location of where the data is to be written to the working address register. This address may be in the form of a binary encoded address signal which will operate through the enabling AND gates 64–67 to set the coarse X and Y deflection control circuits 43, 44 and the fine X and Y deflection control circuits 46, 47 to cause the beam to be deflected to the desired X–Y addressed location on the planar surface of a selected memory capacitor. The timing and control logic circuit will then cause the electron beam to trace across a selected line of data bit sites in a manner to be described hereinafter in connection with FIG. 5, and at appropriate data bit sites will cause the circular trace generator 48 to trace the writing electron beam in a circular path of diameter D while applying an appropriate biasing potential to the memory capacitor from the bias driver circuit 51A–51N as determined by the information stored in the associated data register 71A–71N.

Under circumstances where it is desirable to rewrite completely the information stored in a memory capacitor, or stored within a defined area of one of the memory capacitors, the computer can signal the timing and control logic circuit to activate the raster generator 49 so as to cause the electron beam to raster scan the defined area while uniformly charging or discharging the area being scanned by the application of an appropriate biasing potential by the driver circuit 51A–51N. In the event that the memory capacitors are fabricated from p-type semiconductor, the bias potential supplied from the bias drivers during this raster scan will be positive polarity so as to uniformly charge the insulator surface with positive electric charges. Alternatively, if a memory capacitor employing n-type semiconductor is used, the bias drivers will provide a negative bias potential across the capacitors during the raster scan. Upon completion of writing in of the data to be stored, the timing and control logic circuit 61 will inform the computer that writing has been completed and the information stored.

During reading of previously stored information, the computer will inform the timing control logic circuit 61 that it wishes to read and will supply the address of the desired stored data to the working address register. The working address register will then deflect the reading electron beam to the desired data storage area while the timing and control logic circuit 61 sets the appropriate bias drivers 51A–51N to apply a negative polarity reading potential to the memory capacitor and enable the appropriate sense amplifiers 21A–21N to read the data out from the memory tubes to the working registers 71A–71N. The fine X and Y deflection control circuit 46–47, and if necessary the coarse X and Y deflection control circuit 43 and 44, then cause the reading electron beam to trace across the addressed sites of the stored information while it is serially read-out and supplied through data register 71 a word at a time to the computer. Upon completion of the reading operation the timing and control logic circuit 61 will again signal the computer that read-out has been completed.

The memory system shown in FIG. 4 also is designed to prevent long term degradation of information stored in the memory capacitor over a number of operating cycles due to the integrated effect of random scattering electrons by continuously rewriting each data bit subsequent to data bit read-out. This is accomplished by appropriate design of the timing and control logic circuit 61 so that as the reading-writing electron beam is accessed to each data bit site by the coarse and fine X and Y deflection control circuits, it automatically and sequentially is caused first to read-out the data at the site and then to rewrite the data stored at that site before deflecting the electron beam onto the next data bit site in the line of scan. This is accomplished by appropriately monitoring the output of the sense amplifier supplied to the output data registers 71A–71N and adjusting the bias driver 51A–51N for the sequential read-write operation at each bit so as to properly rewrite either a binary 1 or a binary 0 as determined by the output of the sense amplifier during the reading phase.

The refresh address register 63 when conditioned by timing and control logic circuit 61 causes the write-read electron beam automatically to read out, store and rewrite each data bit site selectively during periods of non-use of the memory by the computer system. Thus, during such periods of non-use by the computer system, the refresh address register 63 continuously will be reading and rewriting all of the data bit sites in the memory system. If at any point during this refresh cycle the computer system desires to use the memory either to write in new data or to read-out data previously stored, the refresh cycle is interrupted and the point at which it is interrupted is stored in the refresh address register 63. The memory system then responds to the request from the computer and upon completion of the requested operation, the refresh cycle is again instituted and continues until the next use by the computer. Consequently, the data bit sites in the memory continuously are read-out and rewritten to prevent long term loss of the data stored in the memory due to the integrated effect of scattering electrons, etc. Again, during each read and rewrite cycle, after writing or reading either a binary 1 or a binary 0 with the appropriate writing-reading bias potential, the bias potential automatically is reversed and the center of the bit sites bombarded for a corresponding period of time to that employed during the write-read cycle to further minimize the effect of random scattering electrons on adjacent bit sites and the overall charge condition of the memory capacitor.

Another available technique is to read-out and store temporarily in the working memory of the computer system, or another peripheral memory in the system, all of the data stored in a memory capacitor. The memory capacitor then is completely rewritten starting from the step of uniformily charging the insulator surface. This is done automatically after a predetermined number of operating cycles under the control of the computer, and hence can be programmed to occur during quiet periods after completion of the predetermined number of cycles.

FIG. 5 is a series of characteristic operating curves illustrating the nature of the various bias voltages, the beam current on-off period of the circular trace generator, and output signals derived from a memory system such as shown in FIG. 4. In FIG. 5 a typical write-"1" -read "1"- write "1"-read "1"-write "0"-read-"0" cycle of operation for a memory capacitor using p-type silicon, is shown. As shown in FIG. 5($a$), it will be seen that the bias potential across the memory capacitor (denoted as $V_{gate\ to\ substrate}$ or $V_{GS}$) during the writing of "1s" is at a value of +5 volts. During the reading of the "1s" the bias is at −5 volts, then again rises to +5 volts for the second write "1," and then drops to −5 volt level for the succeeding read-"1"-write-"0"-read-" 0" cycles. The time duration of each of these intervals is denoted in the brackets marked $t_1$, $t_2$ set forth below the $V_{GS}$ curve shown in FIG. 5($a$). These time intervals are defined as set forth in the following list:

$t_1$—Circular trace settling time and beam rise time, ≳50n–sec $t_2$—Beam on Time, ≳ ∮ ½ u–sec, (depends on beam current)

$t_3$—Circular trace settling time and beam fall time, ≳50n–sec $t_4$—Gage bias transient settling, ≳ 100n–sec $t_5$—Read time, ≳ 500–sec $t_6$—Beam fall time ≳ 50n–sec FIG. 5B of the drawings illustrates the on-off periods of the beam current as determined by the beam blanking signals supplied from the beam gating circuit 42 to the control grid of the electron gun in memory tube 20 or some similar known beam blanking arrangement. From a comparison of FIG. 5($b$) to FIG. 5($a$) it will be seen that the beam current is turned on at a point in time $t_1$ following the rise in potential to +5 volts across the memory capacitor at the initiation of the first write "1" operation. This $t_1$ period is on the order of 50 nanoseconds and represents both the circular trace settling time and the beam rise time required for the beam to obtain substantially its full 50 nanoampere value. Subsequently, the beam is maintained on during the write "1" period $t_2$ which is on the order of ½ microsecond depending upon the value of the beam current. Following the $t_2$ beam-on time, there is a $t_3$ circular trace settling and the beam fall time of about 50 nanoseconds. FIG. 5(C) of the drawings illustrates the on-off time of the circular trace generator wherein it can be seen that the $t_1$ and the $t_3$ periods at the beginning and end of the circular trace on interval, allows for the circular trace rise and fall settling times prior to the beam current reaching its full on value and thereafter falling to substantial zero beam current.

Following the $t_3$ settling time, the bias potential across the memory capacitor is switched to a −5 volt reading potential, and after a $t_4$ gate bias transient settling time of the order of 100 nanoseconds, the reading beam is turned on. It will be noted that the writing beam and the reading beam have about the same beam current and substantially the same energy level of the order of 5–10 kilovolts. While the above description implicitly assumes an electron beam of about 10,000 electron volts (10kv.) energy, this energy was chosen for practical engineering and economic reasons. However, there are no fundamental physical reasons why the electron beam energy could not be varied either up or down from this value. In order that the electron beam irradiating memory capacitor provide an output current, it is necessary to have the electrons penetrate through the upper conductive gate layer and insulator and into the semiconductor layer. Further, it is desirable to have an output current pulse several orders of magnitude larger than the beam current. This requires that the electron beam penetrate into the semiconductor layer of the memory capacitor sandwich for a distance of several thousand angstrom units. An alternative way of stating this is that the beam must still have at least 2,000 electron volts of energy after penetrating through the upper conductive gate layer and the insulator layer. Because of difficulties in fabricating large area devices with very thin but non conducting insulator layers, it has been found practical to employ insulator layers of a minimum thickness of 1,700 angstrom units for memory capacitors with about 0.4cm$^2$ surface area. With such a structure, the electron beam energy at the conductive layer-insulator interface must be at least 4,000 electron volts minimum. The upper conductive layer thicknesses and/or densities are then chosen so that after penetrating the upper conductive layer, the electrons in the beam still retain at least 4,000 electron volts energy. This factor then determines a practical lower limit on the energy of the electron beam. Electrons energetic enough to penetrate more than about a micron into the semiconductor layer, generate no stronger output signal (and in fact possibly less) than those electrons which are stopped within a micron. Thick insulator layers (greater than 0.5 microns) and thick upper conductive gate layers scatter electrons from the electron beam unnecessarily and contribute to poor electron beam definition. Although thick layers can certainly be used, they do not improve device performance and they require the use of higher energy electron beams. Accordingly, it will be appreciated that while there is no overriding physical reason why, for example, a memory could not be made using say a 50,000 electron volt beam (50kv.), there would be little justification to do so. However, should it be desired, electron beam energy level could range anywhere from the minimum 4kv. up to 100kv. electron volts, and still result in a workable device.

The difference between the two writing and reading electron beams primarily is in the time duration in which they are applied. The reading beam current is left on for a time interval $t_5$ of the order of 500 nanoseconds. During this reading interval the circular trace generator will be maintained off as is illustrated in FIG. 5(*c*). Subsequent to the $t_5$ reading interval there is a $t_6$ fall time of about 50 nanoseconds duration before the write "1" reading cycle repeats itself substantially as described above.

At the end of the reading of the second one (i.e., at the end of the second $t_6$ interval) it will be noted that the negative polarity bias potential of −5 volts continues to be applied across the memory capacitor after the third $t_1$ circular trace settling and beam rise time. The beam current again comes on and is maintained on for a corresponding third $t_2$ period for writing in the "0" bit site while the bias potential is maintained at the negative −5 volt value. In FIG. 5(*c*), it will be seen that during the writing of the 0, the circular trace generator is maintained on for a period of time equal to that employed for the writing in of the binary "1s." The reading out of the binary "0" site is comparable to that of the binary 1 site.

FIG. 5(*d*) of the drawings illustrates the output voltage appearing across the load resistor during the periods corresponding to the above described write "1"-read "1"-write "1"-read "1"-write "0"-read "0" cycle of operations. From FIG. 5(*d*), it will be seen that at the initiation and termination of the write 1 cycles, sharp voltage pulses are produced due to the charging and discharging of the capacitor memory by the application of the bias voltages required during the writing of the "one." Also, during the write "1" interval of $t_2$ a correspondingly high output voltage appears across the capacitor. By appropriate gating of the input to the sense amplifier, these voltage pulses are screened out of the output signal read-out of the memory system. The desired information appears only during the $t_5$ reading intervals as relatively sharp voltage pulses produced by the $t_5$ reading periods. From a comparison of the $t_5$ output pulses produced from a reading of a binary "1" to the $t_5$ output pulse produced during the reading of the non-charged binary "0" bit site, it will be seen that the output pulse from the positively charged binary 1 bit sites have an amplitude of at least five times that of the output pulse produced from the binary 0 bit site. This difference is sufficiently great to assure unambiguous read-out of the information stored in the memory.

It should be noted at this point in the description, that the curves shown in FIG. 5 were derived in conjunction with memory capacitors fabricated from p-type semiconductor. If the memory capacitor were fabricated from n-type semiconductor, the curves would be substantially the reverse of those shown in FIG. 5 with some differences. The greatest differences is in the value of the applied bias voltage during reading. For memory capacitors using n-type semiconductor, the reading bias voltage is of the order of −30 to −40 volts. Because switching voltages of this value, while feasible, is not desirable, memory capacitors employing p-type semiconductor are preferred.

From the foregoing description it will be appreciated that the invention provides a new and improved computer memory method of operation and system employing planar metal-insulator-semiconductor-metal memory capacitors disposed in an electron beam apparatus for writing and reading out data bit charge states at data bit sites on the surface of the memory capacitor. The method and system is capable of storing data bits in the memory capacitor with only 20 microns or less center to center spacing between the data bit sites whereby a large capacity quick access memory which is reliable in operation and provides an unambiguous read-out of information stored in the memory, becomes economically feasible.

Having described one embodiment of a method and system for improved operation of metal-insulator-semiconductor-metal capacitor memories having increased storage capability and constructed in accordance with the invention, it is believed obvious that other modifications and variations of the invention are possible in the light of the above teachings. It is therefore to be understood that changes may be made in the particular embodiment of the invention described which are within the full intended scope of the invention as described by the appended claims.

What is claimed is:

1. A memory system employing a planar conductive layer-insulator-semiconductor memory capacitor sandwich for selectively storing an array of electric charges in the insulator layer near the insulator-semiconductor interface in patterns which are representative of binary encoded data comprising means for initially uniformly charging the planar surface of the insulator with positive polarity electric charges, means for maintaining the positive electric charges at certain sites in the planar memory element, and means for removing positive charges to form non-charged enlarged regions of extent D surrounding other sites where D is of the order of an electron path diffusion length in the semiconductor.

2. A memory system according to claim 1 wherein the positive polarity electric charges are formed in the insulator with means for producing and deflecting a penetrating beam of electrons that can be caused to impinge into the insulator layer selectively at the discrete sites or to scan uniformly along substantially the entire surface of the memory capacitor, and means for maintaining a positive electric field gradient across the memory element sandwich whereby the conductive and insulator layer is maintained positive with respect to the underlying semiconductor substrate while bombarding the memory capacitor with the electron beam, and wherein positive charges are selectively removed to form non-charged enlarged regions of extent D by directing the penetrating electron beam selectively to the location where the other sites are to be recorded, means for maintaining a negative polarity electric field gradient across the memory element sandwich while irradiating the selected sites with the electron beam, and means for appropriately manipulating the penetrating beam of electrons at the selected sites to form the non-charged regions of extent D of the order of an electron path diffusion length in the semiconductor.

3. A memory system according to claim 2 wherein the penetrating beam of electrons has a beam diameter $d$ and the means for manipulating the beam of electrons comprises means for additionally deflecting the electron beam in an enlarged trace path at each non-charged site to form the enlarged regions of extent D>d following the selective deflection of the electron beam to the respective sites which are spaced apart by a center-to-center spacing distance L>D whereby a grid-like lattice of positive electric charges is retained and surrounds the sites at the insulator-semiconductor interface to thereby form a corresponding interconnected grid-like lattice layer in the semiconductor adjacent the insulator-semiconductor interface that is highly conductive and which surrounds and interconnects a substantial number of the charged sites.

4. A memory system according to claim 3 further including means for directing a reading electron beam of sufficient energy to penetrate into the region of the semiconductor layer adjacent the insulator-semiconductor interface and of diameter $d$<D to selectively probe the sites while maintaining an appropriate reading bias potential across the memory capacitor sandwich whereby upon probing a charged site, electron-hole pair carriers are formed and are separated by the electric field of a space charge region induced in the semiconductor layer as a consequence of the positive charges, the electron-hole current being conductively connected to the highly conducting grid-like lattice layer in the semiconductor which underlies and is formed by the interconnected grid-like lattice of positive charges surrounding all of the sites to thereby induce a relatively large charging current to the memory capacitor resulting in a large output signal, and whereby upon impinging into a non-charged site, electron-hole pair carriers produced in the semiconductor by the electron beam recombine within the non-charged enlarged region of extent D prior to reaching the strong conducting inverted grid-like lattice layer and hence results in at most a minimal charging current to the memory capacitor that is readily distinguished from the output current produced at the charged sites.

5. A memory system according to claim 4 further including means for automatically rewriting the charge condition at each site immediately following read-out of the site whereby the read-out process is made to be substantially non-destructive in nature.

6. A memory system according to claim 4 further including means for selectively writing in both positive charged and non-charged sites at each site location by appropriate trace manipulation of the electron beam in the presence of either a positive polarity or negative polarity biasing potential across the memory capacitor sandwich whereby either charged areas or non-charged enlarged regions of extent D>$d$ selectively are formed.

7. A memory system according to claim 6 further including means for automatically centering and directing the writing electron beam of diameter $d$<D onto the center of the sites immediately following the writing of the enlarged region of extent D sites and bombarding the center of the enlarged regions of extent D sites with the electron beam while maintaining the bias potential across the memory capacitor of opposite polarity to that used in writing for a period comparable to the writing period whereby interaction on adjacent sites of the memory capacitor due to scattering electrons is minimized.

8. A memory system according to claim 3 further including means for automatically centering and directing the writing electron beam of diameter $d$<D onto the center of the sites immediately following the writing of the enlarged regions of extent D sites and bombarding the center of the enlarged region of extent D sites with the electron beam while maintaining the bias potential across the memory capacitor of opposite polarity to that used in writing for a period comparable to the writing period whereby interaction on adjacent sites of the memory capacitor due to the scattering electrons is minimized.

9. A memory system according to claim 7 further including means for automatically reversing the polarity of the bias applied to the memory capacitor after read-out at each site while maintaining the read-out electron beam impinging on the site for a length of time corresponding to that required during read-out of the site whereby interaction on the charge condition of adjacent sites due to scattering electrons during read-out is minimized.

10. A memory system according to claim 4 further including means for automatically reversing the polarity of the bias applied to the memory capacitor after read-out of each site while maintaining the read-out electron beam impinging on the site for a period of time corresponding to that required during read-out of the site whereby interaction on the charge condition of adjacent sites due to scattering electrons during read-out is minimized.

11. A memory system according to claim 9 wherein the conductive layer covering the insulator of the memory capacitor sandwich and through which the write-read electron beam passes during writing and read-out of the memory element, has a density of the order of 50 micrograms/cm² to minimize the passage of scattering electrons through the conductive layer whereby disturb effects on the memory due to such scattering electrons is minimized.

12. A memory system according to claim 1 wherein the semiconductor layer is doped to reduce electron diffusion path lengths to a minimum within the semiconductor at the insulator-semiconductor interface.

13. A memory system according to claim 1 wherein the portion of the memory element sandwich comprised by the semiconductor and insulator is annealed in a gaseous ambient at high temperatures on the order of 800°C for a period of time sufficient to introduce large quantities of electron-hole recombination centers in the semiconductor at the insulator-semiconductor interface.

14. A memory system according to claim 4 wherein there are a plurality of individual memory capacitor sandwiches arrayed in a common target plane of an electron beam apparatus and the means for producing and deflecting the electron beam comprises a micro-deflection system having individual microlens deflection systems for each respective memory capacitor sandwich whereby recording and read-out of each memory capacitor sandwich can be individually controlled.

15. A memory system according to claim 6 further including read-rewrite cycle control means for automatically rewriting the data stored at each data bit site after read-out.

16. A memory system according to claim 15 further including refresh cycle control means for reading and completely rewriting data stored in the memory system.

17. A memory system according to claim 4 wherein the memory capacitor sandwich comprises a film of Al covering a layer of $SiO_2$ thermally grown on a p-type silicon substrate having an ohmic contact and the Al film through which the write-read electron beam passes during writing and read-out of the memory element, is provided with a thickness of the order of 2,000 A ±500 A to minimize the passage of scattering electrons through the metal film whereby disturb effects on the memory due to such scattering electrons is minimized.

18. A memory system according to claim 17 wherein the semiconductor layer is doped with gold to reduce electron diffusion path lengths to a minimum within the semiconductor at the insulator-semiconductor interface.

19. A memory system according to claim 17 wherein the portion of the memory element sandwich comprised by the semiconductor and insulator is annealed in oxygen at high temperatures on the order of 800°C for a period of time sufficient to introduce large quantities of electron-hole recombination centers in the semiconductor at the insulator-semiconductor interface.

20. In a memory system using a planar conductive layer-insulator-semiconductor memory capacitor sandwich of the type employing the presence or absence of electric charges at a plurality of data sites in the insulator layer near the insulator-semiconductor interface to thereby selectively establish the presence or absence of space-charge regions in the semiconductor layer adjacent the insulator-semiconductor interface under the data sites in accordance with binary data to be stored and subsequently read-out, the improvement comprising means for establishing an interconnected grid-like lattice of strongly inverted, highly conductive semiconductor through a substantial portion of the semiconductor layer at the insulator-semiconductor interface surrounding and interconnecting those sites where electric charges are stored, and means for maintaining the immediate enlarged region of extent D surrounding the remaining sites in a substantially non-inverted poorly conducting condition where D is of the order of an electron path diffusion length in the semiconductor.

21. A memory system according to claim 20 wherein the conductive layer covering the insulator of the memory capacitor sandwich and through which the write-read electron beam passes during writing and read-out of the memory element, has a density of the order of 50 micrograms/$cm^2$ to minimize the passage of scattering electrons through the conductive layer whereby disturb effects on the memory due to such scattering electrons is minimized.

22. A memory system according to claim 20 wherein the semiconductor layer is doped to reduce electron diffusion path lengths to a minimum within the semiconductor at the insulator-semiconductor interface.

23. A memory system according to claim 20 wherein the portion of the memory element sandwich comprised by the semiconductor and insulator is annealed in an oxygen atmosphere at high temperatures on the order of 800°C for a period of time sufficient to introduce large quantities of electron-hole recombination center in the semiconductor at the insulator-semiconductor interface.

24. A memory system according to claim 20 wherein there are a plurality of individual memory capacitor sandwiches arrayed in a common target plane of an electron beam apparatus and the means for producing and deflecting the electron beam comprises a microdeflection system having individual micro-lens deflection system for each respective memory capacitor sandwich whereby recording and read-out of each memory capacitor sandwich can be individually controlled.

25. The method of operating a memory system employing a planar conductive layer insulator-semiconductor memory capacitor sandwich for selectively storing electric charges in the insulator near the insulator-semiconductor interface in patterns which are representative of data to be stored, comprising initially uniformly charging the planar surface of the insulator with positive polarity electrical charges, selectively maintaining positive polarity electrical charges at certain sites and selectively discharging the immediate enlarged regions of extent D surrounding the remaining sites where D is of the order of an electron path diffusion length in the semiconductor.

26. The method according to claim 25 wherein positive polarity electric charges are formed in the insulator by subjecting the memory element sandwich to a penebeam of radiant energy of sufficient energy to impinge into the insulator layer while simultaneously applying a positive electric field gradient across the memory capacitor sandwich in a direction such that the conductive layer and insulator are positive with respect to the semiconductor substrate, and wherein the positive charges selectively are discharged within the enlarged regions of extent D by subjecting the memory element sandwich to the penetrating beam of radiant energy while appropriately manipulating the beam and while applying a negative polarity electric field gradient across the memory element sandwich in a direction such that the conductive layer and insulator are negative with respect to the semiconductor substrate, the sites being spaced apart a distance L>D whereby an interconnected grid-like lattice of positive charges is established throughout a substantial portion of the surface of the insulator surrounding the charged sites at the insulator-semiconductor surface to thereby form a corresponding interconnected grid-like lattice layer of strongly inverted highly conducting semiconductor adjacent the insulator-semiconductor interface surrounding and interconnecting the charged sites but not connected to the non-charged enlarged region sites of extent D.

27. The method according to claim 26 wherein the penetrating beam of radiant energy comprises an electron beam having a beam diameter $d<D<L$ and sufficient energy to penetrate through the upper conductive layer and into the insulator and the electron beam is suitably deflected in a trace path to form the enlarged regions of extent D>$d$ and spaced apart by a center-to-center spacing distance L>D where D is of the order of an electron diffusion path in the semiconductor, and results in establishing the interconnected grid-like lattice of positive charges throughout a substantial portion of the surface of the insulator surrounding the charged sites at the insulator-semiconductor interface.

28. A method according to claim 27 further including reading out the previously stored data with a reading electron beam of diameter $d$<D and of sufficient energy to penetrate into the region of the semiconductor layer adjacent the insulator-semiconductor interface whereby upon the reading electron beam impinging upon positively charged sites, electron-hole pair carriers are formed in a space charge region existing in the semiconductor under the positively charged sites and result in the production of an electron-hole current flow that is interconnected with the highly conductive grid-like inversion layer lattice formed in the semiconductor adjacent the insulator-semiconductor interface to produce a large charging current flow across the memory capacitor sandwich that is distinctive to the positively charged sites, and whereby upon the reading electron beam impinging upon non-charged areas of the insulator, electron-hole pair carriers generated in the semiconductor are strongly attenuated due to recombination before diffusing to the highly conductive interconnected inversion layer lattice as a result of the enlarged region of extent D being of the order of an electron diffusion path length to thereby produce little or no output charging current flow across the memory element sandwich that is distinctive of the non-charged sites.

29. The method according to claim 28 wherein data represented by positive charges at certain sites is written in the same manner as data represented by non-charged sites by maintaining a positive polarity voltage gradient across the memory capacitor sandwich while simultaneously directing the writing beam of penetrating radiation onto the site and manipulating the beam in an enlarged trace path to assure formation of positively charged sites of enlarged region of extent D interconnected with the grid-like lattice of positive charges.

30. The method of claim 29 further including automatically rewriting the charge or non-charge condition at each site immediately following read-out of the site whereby the read-out process is made to be substantially non-destructive in nature.

31. The method of claim 29 further including automatically centering and directing the writing electron beam of diameter $d$<D onto the center of the sites immediately following writing of the enlarged region of extend D sites and irradiating the center of the enlarged region of extent D sites with the electron beam while maintaining the bias potential across the memory capacitor sandwich of opposite polarity to that used in writing the site for a period of time comparable to the original writing period whereby interaction on adjacent sites due to scattering electrons during writing is minimized.

32. The method according to claim 31 further including automatically reversing the polarity of the bias applied to the memory capacitor after read-out of each site while maintaining the read-out electron bema impinging on the site for a period of time corresponding to that required during read-out of the site whereby interaction on the charge condition of adjacent sites due to scattering electrons during read-out is minimized.

33. The method according to claim 28 further including automatically refreshing the memory by reading-out and rewriting each site during periods of non-use by the computer system.

34. The method according to claim 28 further including automatically reading-out and completely rewriting the memory starting with uniformly charging the memory capacitor after a predetermined number of operating cycles.

35. The method according to claim 28 further including pretreating the semiconductor to enhance recombination of the electron-hole pair carriers within the non-charged sites formed by the enlarged region of extent D.

36. The method according to claim 28 further including pretreating the semiconductor to enhance recombination of the electron-hole pair carriers within the non-charged sites formed by the enlarged region of extent D.

37. The method of claim 35 further including forming the conductive layer covering the insulator surface exposed to the electron beam in a manner to provide a density of the order of 50 micrograms/$cm^2$ to minimize the disturb effect of scattered electrons.

38. The method of claim 36 further including forming the conductive layer covering the insulator surface exposed to the electron beam in a manner to provide a density of the order of 50 micrograms/$cm^2$ to minimize the disturb effect of scattered electrons.

39. The method of claim 37 further including treating the internal surfaces of an electron-optical column that forms the write-read electron beam with materials of low back scatter coefficient to minimize multiple scattered electron reflections.

40. The method of claim 38 further including treating the internal surfaces of an electron-optical column that forms the write-read electron beam with materials of low back scatter coefficient to minimize multiple scattered electron reflections.

* * * * *